(12) United States Patent
    Tsuchiya

(10) Patent No.: US 9,074,667 B2
(45) Date of Patent: Jul. 7, 2015

(54) GEAR DRIVE MECHANISM AND LIBRARY DEVICE

(75) Inventor: Manabu Tsuchiya, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 13/876,770

(22) PCT Filed: Jun. 24, 2011

(86) PCT No.: PCT/JP2011/064587
§ 371 (c)(1),
(2), (4) Date: Mar. 28, 2013

(87) PCT Pub. No.: WO2012/042992
PCT Pub. Date: Apr. 5, 2012

(65) Prior Publication Data
US 2013/0186215 A1     Jul. 25, 2013

(30) Foreign Application Priority Data

Sep. 29, 2010  (JP) .................................. 2010-219253

(51) Int. Cl.
| | | |
|---|---|---|
| G11B 21/08 | (2006.01) | |
| G11B 7/085 | (2006.01) | |
| F16H 19/04 | (2006.01) | |
| G11B 15/68 | (2006.01) | |
| F16H 57/12 | (2006.01) | |

(52) U.S. Cl.
CPC ........... *F16H 19/04* (2013.01); *Y10T 74/18808* (2015.01); *G11B 15/68* (2013.01); *F16H 57/12* (2013.01)

(58) Field of Classification Search
CPC ............ G11B 15/682; G11B 15/6825; G11B 15/683; G11B 15/6835; G11B 15/684

USPC .......... 369/30.43, 30.45, 30.49, 30.55, 30.57, 369/30.61, 30.7, 30.72, 30.85, 30.87; 360/91, 92.1
See application file for complete search history.

(56) References Cited

U.S. PATENT DOCUMENTS 4,608,679 A * 8/1986 Rudy et al. ................. 369/30.43
4,675,856 A * 6/1987 Rudy et al. ................. 369/30.41
(Continued)

FOREIGN PATENT DOCUMENTS

JP      59103148 A    12/1985
JP      61019160 U     2/1986
(Continued)

OTHER PUBLICATIONS

Office Action dated Feb. 4, 2014, issued by the Japan Patent Office in corresponding Japanese Application No. 2010-219253.
Communication dated Jul. 22, 2014, issued by the Japanese Patent Office in corresponding Application No. 2010-219253.

*Primary Examiner* — Adam B Dravininkas
(74) *Attorney, Agent, or Firm* — Sughrue Mion, PLLC

(57) ABSTRACT

It is possible to reduce influence of backlash effectively and to carry out precise position control even if a drive mechanism uses rotary drive of gears. For this, in moving a subject to be moved by rotation of the gears, an original point for position control is positioned by use of a sensor flag, and afterward the position control is carried out. When positioning, a bias means generates a bias in a moving direction for movement to be moved that backlash of gear drive may be removed. This sets the backlash to substantial "zero" in positioning the original point, and stabilizes an original point reset position.

2 Claims, 8 Drawing Sheets

(56) References Cited

U.S. PATENT DOCUMENTS

| | | | |
|---|---|---|---|
| 6,813,236 B2 * | 11/2004 | Ezawa et al. | 369/249.1 |
| 7,451,461 B1 * | 11/2008 | Luffel et al. | 720/600 |
| 7,894,157 B2 * | 2/2011 | Green et al. | 360/92.1 |
| 2002/0191500 A1 * | 12/2002 | Sato et al. | 369/30.7 |
| 2003/0103291 A1 * | 6/2003 | Tsuchiya | 360/96.5 |
| 2004/0111735 A1 * | 6/2004 | Yang | 720/671 |
| 2004/0212911 A1 * | 10/2004 | Shimanuki | 360/69 |
| 2005/0174898 A1 * | 8/2005 | Pan | 369/30.27 |
| 2006/0080692 A1 * | 4/2006 | Yang et al. | 720/676 |
| 2007/0030589 A1 * | 2/2007 | Hori et al. | 360/92 |

FOREIGN PATENT DOCUMENTS

| | | | |
|---|---|---|---|
| JP | 10-59541 A | | 3/1998 |
| JP | 10-143959 A | | 5/1998 |
| JP | 10143959 A | * | 5/1998 |
| JP | 2002259034 A | | 9/2002 |
| JP | 2003-131311 A | | 5/2003 |
| JP | 2004-326894 A | | 11/2004 |
| JP | 2009-176376 A | | 8/2009 |

* cited by examiner

GEAR DRIVE MECHANISM AND LIBRARY DEVICE

CROSS REFERENCE TO RELATED APPLICATIONS

This application is a National Stage of International Application No. PCT/JP2011/064587 filed Jun. 24, 2011, claiming priority based on Japanese Patent Application No. 2010-219253 filed Sep. 29, 2010, the contents of all of which are incorporated herein by reference in their entirety.

TECHNICAL FIELD

The present invention relates to a gear drive mechanism and a library device which move a subject to be moved to a desired position by rotary drive of gears.

BACKGROUND ART

Generally, backlash occurs in a movement mechanism which uses a gearbox. Therefore, in a case of such the mechanism which requires accuracy on positioning in a view point of a function of the mechanism, a mechanism and a control, on which influence of the backlash is taken into consideration, are needed.

For this reason, firstly, the backlash is measured with a software control and a corrected value on position is calculated. Next, a method for removing the backlash through feeding back the corrected value on the position to a position control process with the software control is known.

As the above-mentioned method for correcting the position of the subject to be moved with the software control, a method for correcting the position of the subject to be moved in the case of driving by a gearbox which uses a stepping motor will be described with reference to FIG. 1.

The stepping motor is rotated on the basis of number of applied pulses. For this reason, a rotary drive by the stepping motor can realize the correct position control for the subject to be moved.

In an operation of correcting a position of the subject to be moved with the software control, firstly, the subject to be moved is moved to a position of an original point by the gearbox, and an original point reset is carried out at the position (Step S1). Then, the subject to be moved is moved by a distance, which is corresponding to 25 pulses, in a plus direction from the reset position of the original point (Step S2), and number of pulses "A", which are required for returning the subject to be moved to the original point, is counted (Step S3). Moreover, with the software control, the subject to be moved is moved by a distance corresponding to 25 pulses in a minus direction from the position of the original point (Step S4), and number of pulses "B", which are required for returning the subject to be moved to the original point, is counted (Step S5).

A difference between the measured value and a theoretical value (feeding pulse) in the plus direction and a difference in the minus direction are calculated by use of the measured values "A" and "B" which are obtained in this way, and an average value of the differences is defined as backlash (XB). When the above is expressed in a formula, the formula is shown as follows:

$XB\_A = |\text{pulse "}A\text{"}| - 25 \text{ pulse},$ $XB\_B = |\text{pulse "}B\text{"}| - 25 \text{ pulse, and}$ $\text{Backlash}(XB) = (XB\_A + XB\_B)/2.$ A pan-tilt camera, which corrects a position of a subject to be moved with the software control mentioned above and which corrects backlash in a drive mechanism, is known (for example, refer to patent literature 1).

CITATION LIST

Patent Literature

[Patent literature 1] Japanese Patent Application Laid-Open Publication No. 2003-131311

SUMMARY OF INVENTION

Technical Problem

However, when counting number of the pulses in the case of correcting the backlash with the software control as mentioned above, there is a fear that measured values includes variation caused by influence of an inertia force or the like due to weight of the subject to be moved. When the measured value includes the variation in this way, there is a problem that reliability on the corrected value, which is fed back with the software control, becomes degraded.

Moreover, the above-mentioned patent literature 1 also describes correcting the backlash with the software control.

The present invention has been conceived with taking the situation mentioned above into consideration. One of an object of the present invention is to provide a gear drive mechanism and a library device which can reduce influence of the backlash effectively and can carry out precise position control even when the drive mechanism uses rotary drive of gears.

Solution to Problem

In order to achieve the object, the gear drive mechanism according to the present invention is characterized in that the gear drive mechanism moves the subject to be moved by rotation of gears, and positions an original point, which is used for position control, by use of the prescribed original point indicator, and generates a bias by use of the bias means in a direction of movement of the subject to be moved so that backlash of gear drive may be removed.

Moreover, the library device according to the present invention is characterized by including: a magazine capable of storing a cartridge; a drive to carry out reading from a recording medium in the cartridge read and writing into the recording medium; an accessor to move the cartridge stored in the magazine to or from the drive; and the above-mentioned gear drive mechanism according to the present invention, and by moving the accessor, which is an subject to be moved, along a prescribed driving path by use of the gear drive mechanism.

Advantageous Effects of Invention

As mentioned above, according to the present invention, it is possible to reduce the influence of the backlash effectively and to carry out the precise position control even if the drive mechanism uses the rotary drive of the gears.

DESCRIPTION OF EMBODIMENTS

Next, one exemplary embodiment, which uses a gear drive mechanism and a library device according to the present invention, will be described in detail with reference to drawings.

Firstly, an outline of the exemplary embodiment will be described.

According to the library device of the exemplary embodiment, a plurality of magnetic tape cartridges (hereinafter, abbreviated as cartridge), each of which stores a magnetic tape, can be stored in a cartridge storing shelf (hereinafter, abbreviated as magazine) which can be detached, and a magnetic tape drive (hereinafter, abbreviated as drive) can be attached and detached. Moreover, the library device includes an accessor mechanism which moves the cartridge between the magazine and the drive.

According to this exemplary embodiment, it is intended that a position difference is not caused by the inertia force of weight of the accessor when positioning an original point which is used for carrying out position control to the accessor. Therefore, a bias mechanism is arranged on the accessor, and the bias mechanism works at a time of sensing. This operation can set the backlash to substantial "zero" in positioning of the original point of the accessor, and can stabilize a reset position of the original point.

Figure 1:
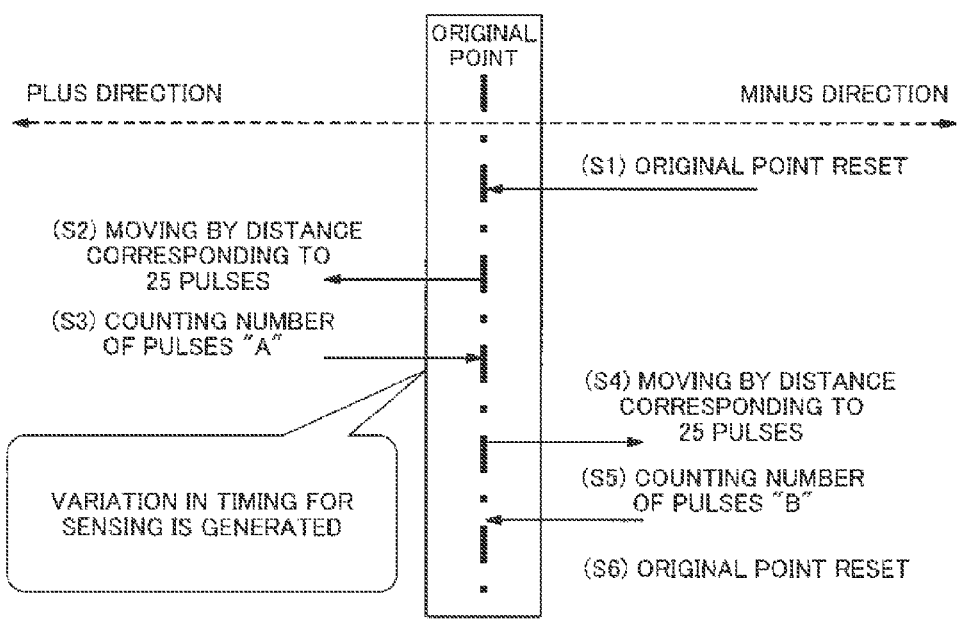
FIG. 1 shows an example of an operation for correcting a position with a software control as a related art.
Figure 2:
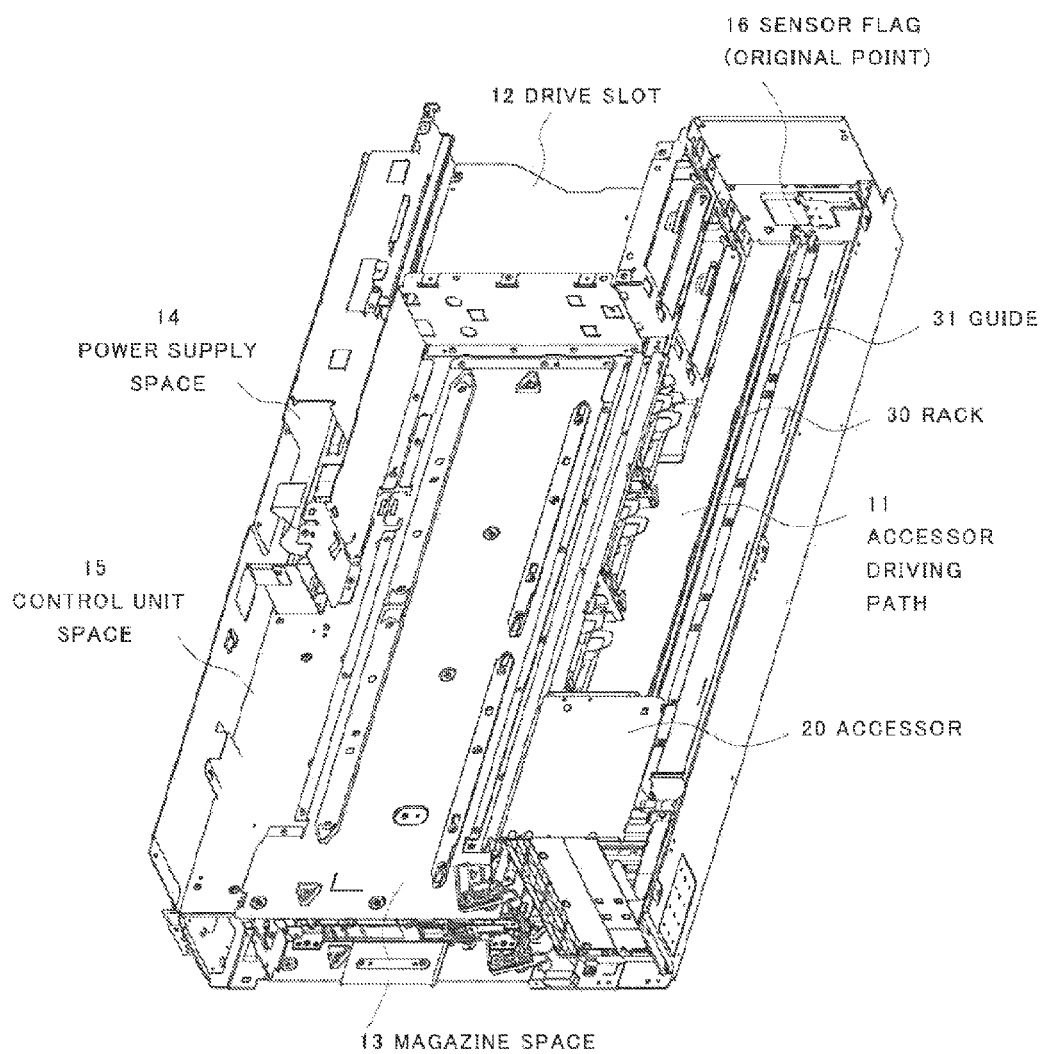
FIG. 2 is a perspective view showing structure of a chassis of a library device as an exemplary embodiment according to the present invention.
Figure 3:
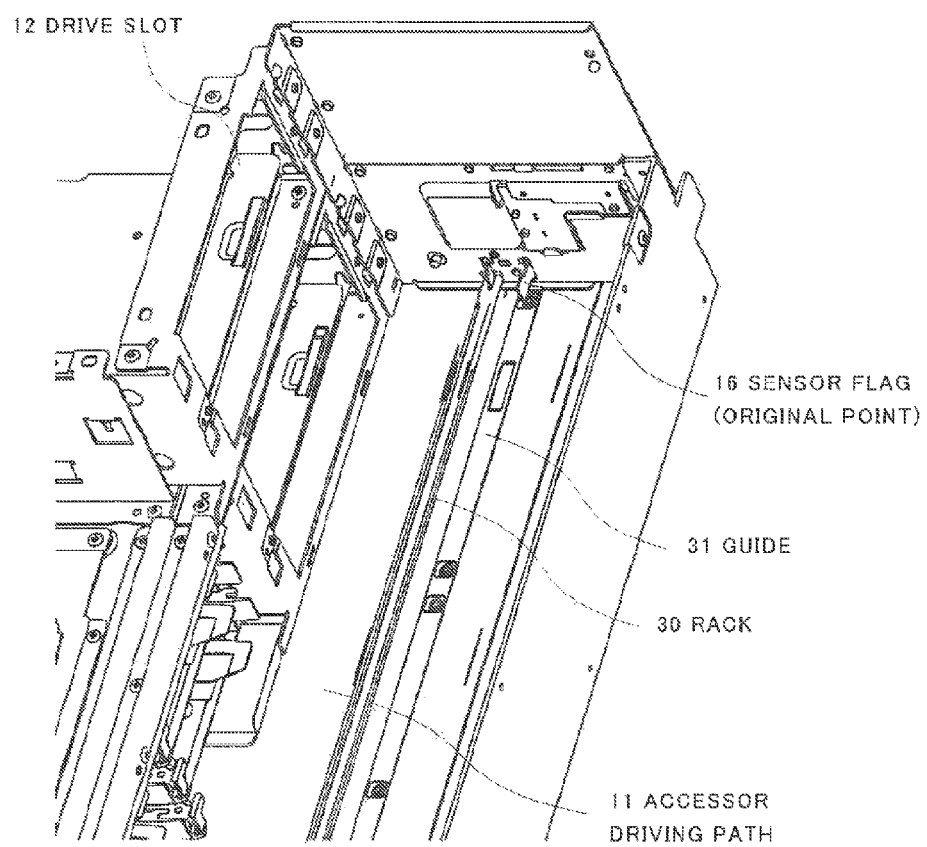
FIG. 3 is a partially enlarged perspective view showing a vicinity of a sensor flag of the chassis.

Next, a structure of the library device having a chassis according to the exemplary embodiment will be described with reference to FIG. 2 and FIG. 3. Each of FIG. 2 and FIG. 3 shows the structure of the chassis of the library device according to the exemplary embodiment on which a component such as a drive, a power supply or the like has not been mounted yet.

The library device according to the exemplary embodiment has the structure including an accessor driving path 11, a drive slot 12, a magazine space 13, a power supply space 14 and a control unit space 15 separately as a structure inside of the chassis.

An accessor 20, a rack 30 and a guide 31 are arranged on the accessor driving path 11. The accessor 20 can be moved on a straight line along the rack 30 and the guide 31 which are arranged in parallel.

A sensor flag 16 is arranged at an end of the accessor driving path 11 and on a side of the drive slot 12, and the accessor 20 positions the original point, which is used for the position control, by use of the sensor flag 16.

Various drives, which carry out reading from the magnetic tape in the cartridge and writing into the magnetic tape, can be installed in the drive slot 12.

The magazine, which stores a plurality of the cartridges, can be installed in the magazine space 13.

A power supply unit, which is stored in the power supply space 14, supplies electric power to each part in the device such as the accessor 20 and the drive.

A control unit, which is stored in the control unit space 15, works in cooperation with control by a control program which is installed in PC (not shown in the figures) connected with the library device according to the exemplary embodiment, and controls an operation of each part of the library device.

By the above-mentioned structure of the library device according to the exemplary embodiment, firstly, the accessor 20 is moved between a prescribed position where the cartridge is attached to and detached from the magazine, and the prescribed position where the cartridge is attached to and detached from the drive. Next, the accessor mechanism mounted on the accessor 20 makes the cartridge move between a prescribed position of the magazine and a prescribed position of the drive.

The examples shown in FIG. 2 and FIG. 3 show that the accessor 20 is in a state that a component required for moving the cartridge is detached. Since structure for moving the cartridge, and structure of the drive and the magazine are well known, description on the structure is omitted.

Next, the accessor 20 and its drive mechanism in the library device according to the exemplary embodiment will be described with reference to FIGS. 4 to 6.

Figure 4:
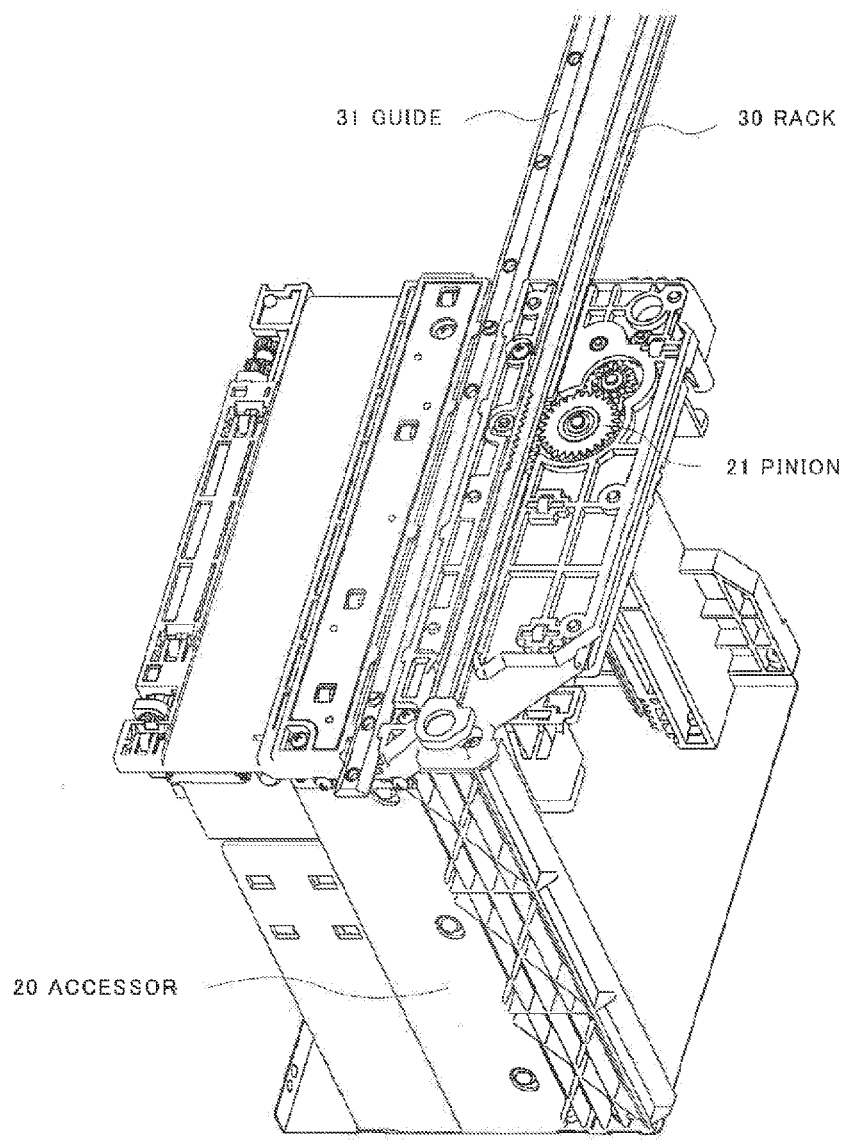
FIG. 4 is a perspective view showing a state that an outer board of a bottom plate of an accessor 20 is detached partially.

FIG. 4 is a perspective view showing a state that an outer board of a bottom plate of the accessor 20 is detached partially.

Through transmitting rotary force generated by a stepping motor (not shown in the figures), which is a drive means, to a gearbox (not shown in the figures), the accessor 20 makes a rotary speed lowered and transmits the lowered rotary speed to a pinion 21. In this way, through transmitting the rotary force to the pinion 21 and meshing the pinion 21 with the rack 30, the accessor 20 is moved on the straight line along the guide 31.

Figure 5:
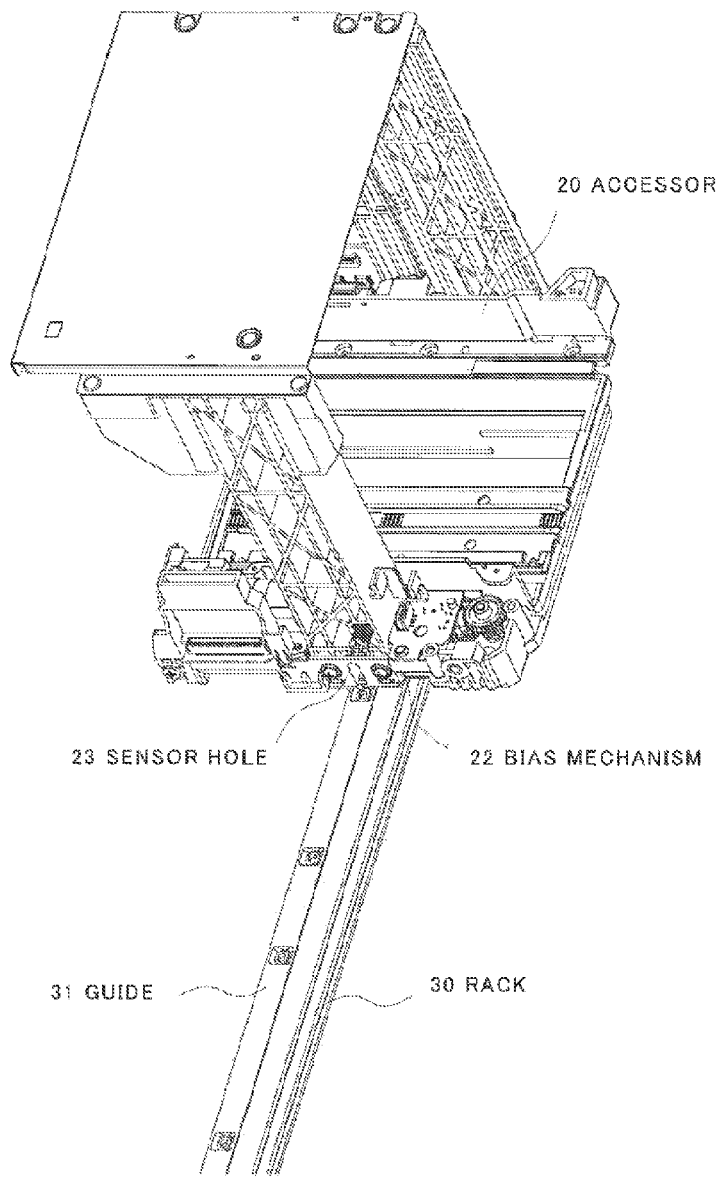
FIG. 5 is a perspective view showing a sensor hole 23 side around the accessor 20.
Figure 6:
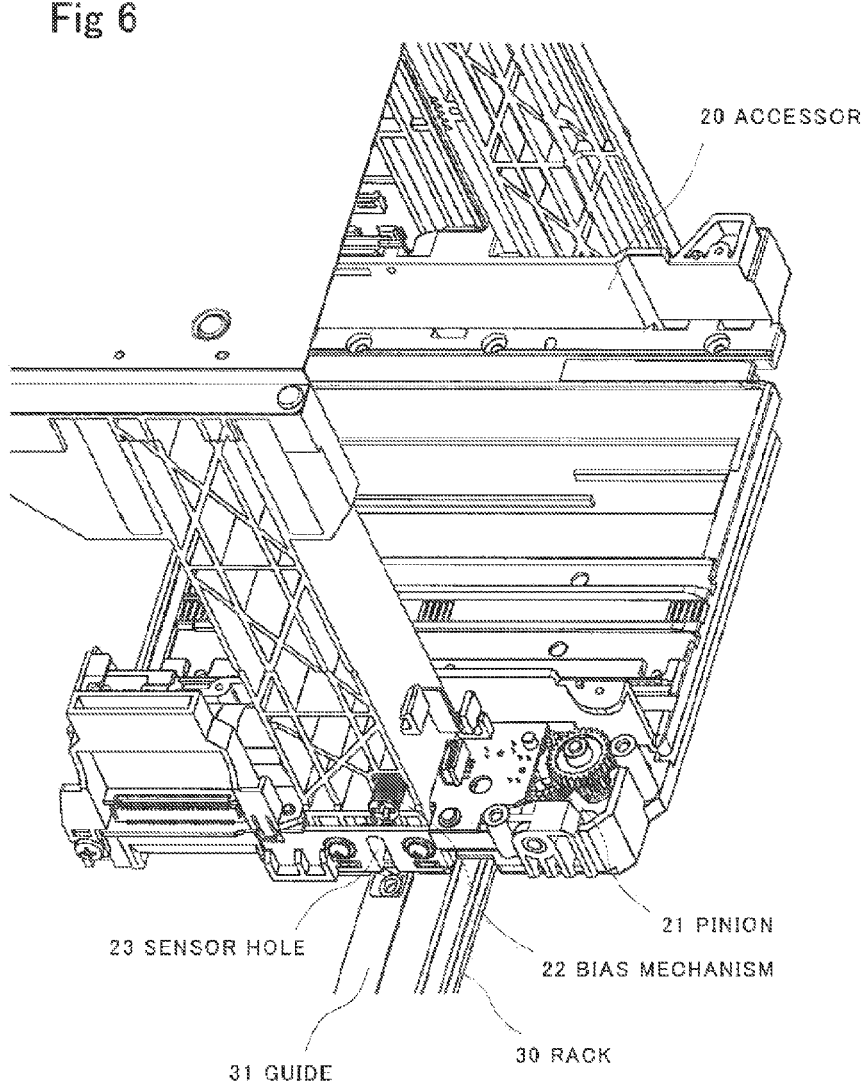
FIG. 6 is partially enlarged perspective view showing a vicinity of the sensor hole 23 around the accessor 20.

As shown in FIG. 5 and FIG. 6, the accessor 20 includes a bias mechanism 22 and a sensor hole 23 on an outer wall in a direction of the sensor flag 16 and in a direction of the movement.

For this reason, when the accessor 20 approaches a wall of the chassis of the device, which is on the drive slot 12 side, up to a position apart by the prescribed distance, the sensor flag 16, which is made of a tabular member, is inserted into the sensor hole 23. Moreover, through pushing the bias mechanism 22 against a wall which is arranged inside the chassis, a bias is generated in a direction leaving from the wall of the drive slot 12.

Figure 7:
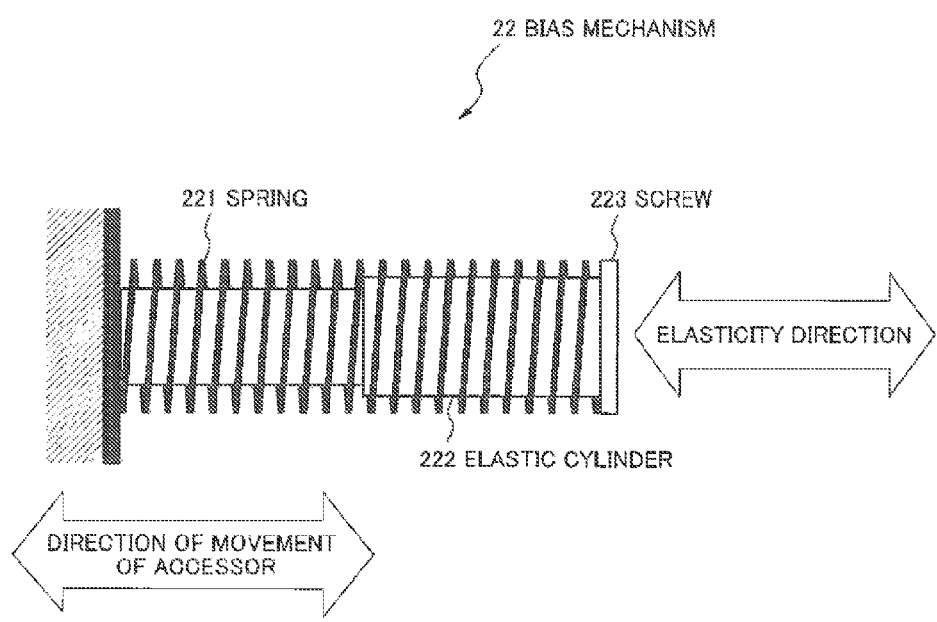
FIG. 7 is a side view showing an example of structure of a bias mechanism 22.

FIG. 7 shows an example for a structure of the bias mechanism 22.

As shown in this FIG. 7, the bias mechanism 22 has structure that an elastic cylinder 222 is arranged inside of a spring 221 which is in a shape of coil, and a screw 223 is fitted in a screw hole which is arranged at an end of the elastic cylinder 222. For this reason, in the case that the screw 223 is pushed against the inner wall of the chassis of the device, the spring 221 is deformed elastically between the screw 223 and the wall of the accessor, and consequently restoration force by the elasticity is generated.

The elastic cylinder 222 is elastic only in a direction vertical to a mount plane of a wall of the accessor 20 on which the bias mechanism 22 is mounted. Moreover, the bias mechanism 22 is mounted on the wall of the accessor 20 so that the elasticity direction of the elastic cylinder 222 may become coincident with the direction of movement of the accessor 20.

For this reason, when the accessor 20 approaches the wall, which is arranged on the drive slot 12 side, up to the position apart by the prescribed distance, the screw 223 is pushed against an inner wall of the chassis of the device. Then, the spring 221 is deformed elastically along the elasticity direction of the elastic cylinder 222 without being twisted and bent by the pushing force. When the spring 221 is deformed elastically, the restoration force by the elasticity is generated in the elasticity direction of the elastic cylinder 222, that is, in a direction leaving from the inner wall of the chassis of the device, against which the screw 223 is pushed, along the direction of the movement of the accessor, and the restoration force works as the bias.

Figure 8:
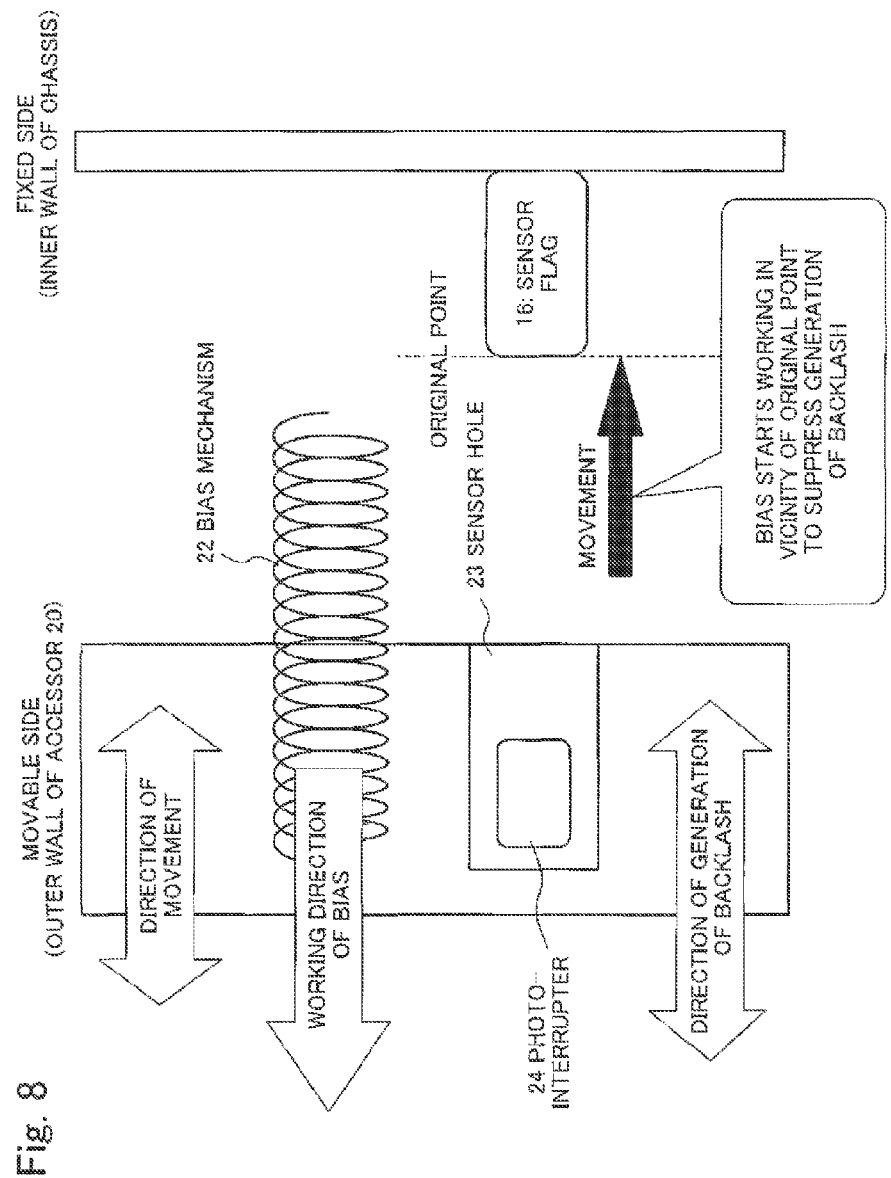
FIG. 8 shows an outline of an operation for positioning an original point, and main structure.

FIG. 8 shows an outline of an operation for positioning an original point according to the exemplary embodiment.

The sensor flag 16 is made of the tabular member as mentioned above. The accessor 20 is moved on the accessor driving path 11 toward the drive slot 12 side. When the accessor approaches the wall of the chassis of the device up to the position apart by the prescribed distance, the sensor flag 16 is inserted in the sensor hole 23.

A photo-interrupter 24 is arranged inside the sensor hole 23. The photo-interrupter 24 includes a light emitting part and a light receiving part which are not shown in the figures, and detects whether or not the light from the light emitting part is received by the light receiving part.

The sensor flag 16, which is made of the tabular member, is inserted into the sensor hole 23 as mentioned above. When the sensor flag 16 interrupts the light from the light emitting part of the photo-interrupter 24, the control unit, which carries out the position control to the accessor 20, carries out an original point reset so that the position of the accessor 20 where the light receiving part of the photo-interrupter 24 does not receive the light any more may be set as the original point.

As mentioned above, the position, where the light from the light emitting part of the photo-interrupter 24 is interrupted, at an edge of the sensor flag 16 which is made of the tabular member is defined as the original point which is used in the position control for the accessor 20.

Moreover, when the accessor 20 approaches the wall of the chassis of the device, on which the sensor flag 16 is mounted, up to the position apart by the prescribed distance, the screw 223 arranged at a tip of the bias mechanism 22 comes in contact with the inner wall of the chassis of the device. When the accessors 20 moves furthermore from the position, where the accessor 20 exists when the screw 223 arranged at a tip of the bias mechanism 22 comes in contact with the inner wall of the chassis of the device, in the direction of the movement of the accessor 20 and in the direction toward the sensor flag 16, the spring 221 of the bias mechanism 22 is deformed elastically. By the elastic deformation, the restoration force is generated in the direction leaving from the wall of the chassis of the device on which the sensor flag 16 is mounted, and the restoration force works as the bias.

Here, a length of the bias mechanism 22 is set so that, when the accessor 20 moves toward the original point, the tip may come in contact with the inner wall of the chassis of the device before the accessor 20 reaches the original point, and generation of the restoration force may start. For this reason, at a time when a photo-interrupter 24 detects the original point by use of the sensor flag 16 as mentioned above, the tip of the bias mechanism 22 has already come in contact with the inner wall of the chassis of the device, and the bias has started working.

Moreover, a direction where the bias works is coincident with the direction of the movement of the accessor as mentioned above. Moreover, since a direction of generation of the backlash by the gearbox or the rack-pinion mechanism for driving the accessor 20 is also coincident with the direction of the movement of the accessor 20, the direction where the bias works is coincident with the direction of the generation of the backlash.

For this reason, when the photo-interrupter 24 detects the original point by use of the sensor flag 16 as mentioned above, the bias generated by the bias mechanism 22 works on the gearbox and the rack-pinion mechanism to make the backlash substantial "zero". For this reason, it is possible to position the original point of the accessor 20 stably in a state of the null backlash.

As mentioned above, the control unit of the accessor 20 carries out the original point reset stably and carries out the position control on the basis of the moving distance of the accessor 20's moving from the original point.

The stepping motor as a driving means which moves the accessor 20 is rotated according to number of applied pulses. For this reason, it is possible to calculate the moving distance of the accessor 20's moving from the original point in the direction of the movement through counting the number of pulses which the control unit applies to the stepping motor. As a result, it is possible to realize drive control for positioning the accessor 20 precisely.

According to the exemplary embodiment, since to position the original point of the accessor 20 is carried out in a state that the backlash is removed as mentioned above, it is possible to carry out the original point reset of the accessor 20 stably. For this reason, it is possible to carry out the precise position control to the accessor 20 on the basis of the position of the original point which is positioned certainly.

The above-mentioned reset process to the original point of the accessor 20 may be carried out at various prescribed timing such as timing when the accessor 20 exists in the vicinity of the sensor flag 16 during the accessor 20 moves on the accessor driving path 11, or when electric power supply to the device is activated.

As mentioned above, according to the exemplary embodiment of the present invention, timing when the bias generated by the bias mechanism 22 works is synchronized with timing when the photo-interrupter 24 starts sensing the sensor flag 16. For this reason, it is possible to sense the original point of the accessor 20 in the state that a play due to the backlash generated in the gearbox or the rack-pinion mechanism for driving the accessor 20 which is movable is removed. For this reason, it is possible to stabilize the sensing position for positioning the original point of the accessor 20.

According to the exemplary embodiment mentioned above, since the positioning of the original point is carried out with making the backlash substantial "zero" by virtue of the bias mechanism mounted on the accessor 20, it is unnecessary to carry out the position correction with the software control which is mandatory in case of the conventional method, and it is possible to carry out the precise position control.

For this reason, it is possible to stabilize the original point reset position of the accessor 20 of the accessor mechanism in the magnetic tape library device, and it is possible to improve precision of the position control.

Here, since each the exemplary embodiment mentioned above is a preferable embodiment according to the present invention, the present invention is not limited to the contents mentioned above. It is possible to apply various modifications on the basis of the technological concept of the present invention, and to carry out the modified exemplary embodiment.

For example, the elastic member, whose elastic deformation generates the restoration force in the bias mechanism 22, is not limited to the coil spring mentioned above. For example, it is possible to realize the present invention by use of a leaf spring.

Moreover, the structure of the bias mechanism 22 is not limited to the structure that the bias mechanism 22 is mounted on the accessor 20 as shown in the exemplary embodiment mentioned above. For example, it may be applicable that the bias mechanism 22 is mounted on the inner wall of the chassis. That is, as far as it is possible to make the restoration force, which is generated by the elastic deformation, work in the direction where bias of the accessor 20, the bias mechanism may be at any position.

Moreover, the bias mechanism is not limited to one which generates the bias only in the vicinity of the original point as shown in the exemplary embodiment. For example, structure to make the bias work on the accessor 20 through a whole of the accessor driving path 11 by use of a fixed load spring or the like also can realize the present invention.

Moreover, the position of the sensor flag 16 which defines the original point is not limited to the drive slot side as shown in the exemplary embodiment. For example, structure that the sensor flag 16 is arranged at a position opposite to the direction of the movement on the accessor driving path 11, also can realize the present invention.

Moreover, as far as the photo-interrupter 24 can detect the position of the original point in a state that the accessor 20 stays at the original point, it may be applicable that the sensor flag 16 is arranged at any position such as on a ceiling or a floor of the chassis of the device. In this case, the photo-interrupter 24 is arranged at a position corresponding to the position of the sensor flag 16 so that the photo-interrupter 24 may detect the position of the original point by use of the sensor flag 16.

Moreover, the sensor which detects the position of the original point by use of the sensor flag is not limited to the photo-interrupter shown in the exemplary embodiment. For example, any sensor is applicable as far as the sensor can judge the position of the original point on the basis of a prescribed original point indicator.

Moreover, the drive mechanism which moves the accessor 20 is not limited to the rack-pinion mechanism shown in the exemplary embodiment. For example, various gear drive mechanisms such as a gear drive mechanism using a worm gear are applicable to the present invention.

Moreover, the exemplary embodiment mentioned above has been described as the example which applies the present invention to the library device using the magnetic tape cartridge. However, the present invention is not limited to this example. It is possible similarly to apply the present invention to various gear drive mechanisms.

While the structure that the subject to be moved, which the gear drive mechanism moves, is the accessor 20 has been exemplified according to the exemplary embodiment mentioned above, the subject to be moved is not limited to the structure. It may be applicable that the subject to be moved is a component corresponding to an applied device.

Moreover, the path on which the gear drive mechanism moves the subject to be moved is not limited to the straight line. It may be applicable that the path has any shape as far as the gear drive mechanism can move the subject to be moved on the path. In this case, the bias mechanism according to the exemplary embodiment mentioned above is arranged so that, when the subject to be moved moves in the vicinity of the original point, the bias may work in the vicinity of the original point in the direction leaving from the original point and in the direction of the movement.

This application is based upon and claims the benefit of priority from Japanese Patent Application No. 2010-219253, filed on Sep. 29, 2010, the disclosure of which is incorporated herein in its entirety by reference.

REFERENCE OF SIGN LIST

11 Accessor driving path
12 Drive slot
13 Magazine space
14 Power supply space
15 Control unit space
16 Sensor flag
20 Accessor
21 Pinion
22 Bias mechanism
221 Spring
222 Elastic cylinder
223 Screw
23 Sensor hole
24 Photo-interrupter
30 Rack
31 Guide

The invention claimed is:

1. A library device, comprising:
a magazine capable of storing a cartridge;
a drive configured to carry out reading from a recording medium in the cartridge and writing into the recording medium;
an accessor configured to move the cartridge stored in the magazine from or to the drive;
an indicator;
a bias mechanism; and
a gear drive mechanism,
wherein:
  the gear drive mechanism is configured to move the accessor along a prescribed driving path by a rotation of a gear,
  an original point, for position control, of the accessor is positioned by use of a detection result from a detection mechanism for the indicator, which is arranged at one end of the driving path in a direction of a movement of the original point,
  when positioning the original point, the bias mechanism generates a bias in a direction of a movement of the accessor so that backlash of the gear drive mechanism may be removed, synchronously to the detection of the indicator by the detection mechanism,
  the bias mechanism is arranged on at least one of:
    a portion of the accessor, which faces to the original point in a direction approaching the original point, and
    a portion of an inner wall of a chassis at the original point side,
  when the accessor is moved, the bias mechanism is pushed and pressed between the accessor and the inner wall of the chassis, and
  when the bias mechanism is pushed and pressed, the bias mechanism generates a restoration force according to an elasticity of the accessor and the inner wall of the chassis.

2. A library device, comprising:
a magazine capable of storing a cartridge;
a drive configured to carry out reading from a recording medium in the cartridge and writing into the recording medium;
an accessor configured to move the cartridge stored in the magazine from or to the drive;
a bias mechanism;
a gear;
a gear drive mechanism; and an original point indicator configured to define an original point of the accessor which is used for controlling a position of the accessor, a detection mechanism, which is arranged on the accessor, to detect the original point indicator, wherein:
the gear drive mechanism is configured to move the accessor along a prescribed driving path by a rotation of the gear,
the original point indicator is arranged at one end of the driving path in a direction of a movement of the accessor;
a position of the original point is defined as a position where the detection mechanism detects a prescribed position of the original point indicator, by movement of the accessor;
when the accessor stays in the vicinity of the original point, the bias mechanism generates a restoration force according to elastic deformation in a vicinity of the original point in a direction away from the original point and along the direction of the movement of the accessor, synchronously to the detection of original point indicator by the detection mechanism;
the bias mechanism is arranged on at least one of:
 a portion of the accessor, which faces the original point in a direction approaching both the original point, and
 a portion of an inner wall of a chassis at the original point side;
when the accessor is moved, the bias mechanism is pushed and pressed between the accessor and the inner wall of the chassis; and
when the bias mechanism is pushed and pressed, the bias mechanism generates a restoration force according to an elasticity of the accessor and the inner wall.

* * * * *